(12) United States Patent
Mizukami et al.

(10) Patent No.: US 8,987,955 B2
(45) Date of Patent: *Mar. 24, 2015

(54) ELECTRIC MOTOR AND ELECTRIC DEVICE INCLUDING THE SAME

(75) Inventors: Hirofumi Mizukami, Osaka (JP);
Akihiko Watanabe, Osaka (JP);
Takehiko Hasegawa, Osaka (JP);
Haruhiko Kado, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 250 days.

This patent is subject to a terminal disclaimer.

(21) Appl. No.: 13/642,447

(22) PCT Filed: May 12, 2010

(86) PCT No.: PCT/JP2010/003203
§ 371 (c)(1),
(2), (4) Date: Oct. 19, 2012

(87) PCT Pub. No.: WO2011/141957
PCT Pub. Date: Nov. 17, 2011

(65) Prior Publication Data
US 2013/0043748 A1 Feb. 21, 2013

(51) Int. Cl.
*H02K 5/16* (2006.01)
*H02K 11/00* (2006.01)

(52) U.S. Cl.
CPC ............ *H02K 11/0089* (2013.01); *H02K 5/161* (2013.01)
USPC .................. 310/72; 310/43; 310/71

(58) Field of Classification Search
None
See application file for complete search history.

(56) References Cited

U.S. PATENT DOCUMENTS

| 8,502,427 | B2 * | 8/2013 | Mizukami et al. .............. 310/72 |
| 8,536,756 | B2 * | 9/2013 | Watanabe et al. ............. 310/196 |
| 8,546,989 | B2 * | 10/2013 | Watanabe et al. ........ 310/156.01 |
| 8,552,601 | B2 * | 10/2013 | Mizukami et al. .............. 310/43 |
| 8,587,167 | B2 * | 11/2013 | Kado et al. .................. 310/68 R |
| 2003/0057783 | A1 | 3/2003 | Melfi |

(Continued)

FOREIGN PATENT DOCUMENTS

| CN | 101325351 A | 12/2008 |
| JP | 2004-242412 A | 8/2004 |

(Continued)

OTHER PUBLICATIONS

Chinese Office Action issued on Chinese application serial No. 201080066745.8, dated May 27, 2014, 14 pages.

(Continued)

*Primary Examiner* — Tran Nguyen
(74) *Attorney, Agent, or Firm* — Brinks Gilson & Lione

(57) ABSTRACT

A stator, a rotor, bearings, and conductive brackets are provided. The stator has a stator iron core having a winding wound thereon. The rotor has a rotating body that holds a permanent magnet in the circumferential direction so that the permanent magnet faces the stator, and a shaft that has the rotating body fastened thereto so as to penetrate through the center of the rotating body. Both of the bearing on the output shaft side and the bearing opposite the output shaft side journal the shaft. One of the brackets fixes the bearing on the output shaft side, and the other of the brackets fixes the bracket opposite the output shaft side. The brackets are electrically connected to each other, and a dielectric layer is formed between the shaft and the outer periphery of the rotating body.

17 Claims, 11 Drawing Sheets

(56) References Cited

U.S. PATENT DOCUMENTS

| | | |
|---|---|---|
| 2008/0042499 A1 | 2/2008 | Okada |
| 2011/0043071 A1 | 2/2011 | Mizukami et al. |
| 2011/0234024 A1* | 9/2011 | Hasegawa et al. ............... 310/43 |
| 2012/0032536 A1* | 2/2012 | Kado et al. ...................... 310/43 |
| 2012/0112588 A1* | 5/2012 | Watanabe et al. ............... 310/90 |
| 2012/0274157 A1* | 11/2012 | Watanabe et al. ............... 310/43 |
| 2013/0119806 A1* | 5/2013 | Watanabe et al. ......... 310/156.01 |
| 2014/0015363 A1* | 1/2014 | Kowa et al. .............. 310/156.01 |

FOREIGN PATENT DOCUMENTS

| | | |
|---|---|---|
| JP | 3775370 B2 | 5/2006 |
| JP | 2007-089338 A | 4/2007 |
| JP | 2007-159302 A | 6/2007 |
| JP | 2009-171750 A | 7/2009 |
| WO | WO 2009/113311 A1 | 9/2009 |

OTHER PUBLICATIONS

International Search Report for International Application No. PCT/JP2010/003203, dated May 26, 2011, 2 pages.

English Language Translation of Supplementary Search Report in Corresponding Chinese Application No. 201080066745.8, dated Sep. 30, 2014, 2 pages.

* cited by examiner

FIG. 10

|  |  |  | Comparative Example 1 | Comparative Example 2 | Comparative Example 3 | Comparative Example 4 | Example 1 | |
|---|---|---|---|---|---|---|---|---|
| Resin thickness |  |  | No resin (0 mm) | No resin (0 mm) | 2.5 mm | 2.5 mm | 2.5 mm | 2.5 mm |
| Insulating resin |  |  | - | - | PBT resin | SPS resin | PBT resin | SPS resin |
| Electrical continuity between bracket 17 on output shaft side and bracket 19 opposite output shaft side |  |  | Not provided | Provided | Not provided | Not provided | Provided | Provided |
| Bearing output shaft side | Shaft voltage | V | 17 | 15 | 8 | 5 | 3 | 4 |
|  | State of shaft voltage waveform |  | Complete deformation | Complete deformation | Partly deformation | No deformation | No deformation | No deformation |
|  | Direction of shaft voltage waveform |  | Up | Up | Up | Up | Down | Down |
|  | Current direction |  | Inner->outer ring | Inner->outer ring | Inner->outer ring | Inner->outer ring | Outer->inner ring | Outer->inner ring |
| Impedance of bracket on output shaft side |  | kΩ | 460 | 370 | 540 | 550 | 460 | 480 |
| Bearing on opposite output shaft side | Shaft voltage | V | 21 | Same as bearing output shaft side | 3 | 2 | Same as bearing output shaft side | Same as bearing output shaft side |
|  | State of shaft voltage waveform |  | Complete deformation |  | No deformation | No deformation |  |  |
|  | Direction of shaft voltage waveform |  | Up |  | Up | Up |  |  |
|  | Current direction |  | Inner->outer ring |  | Inner->outer ring | Inner->outer ring |  |  |
| Impedance of bracket opposite output shaft side |  | kΩ | 1200 |  | 1600 | 1600 |  |  |
| Impedance of rotor side |  | kΩ | 360 | 340 | 1050 | 1124 | 960 | 1020 |
| Electrolytic corrosion test result |  | h | ≤500 | 500-1000 | 1000-1500 | 1000-1500 | 3000≤ | 3000≤ |

ELECTRIC MOTOR AND ELECTRIC DEVICE INCLUDING THE SAME

This application is a 371 application of PCT/JP2010/003203 having an international filing date of May 12, 2010, the content of which is incorporated herein by reference.

TECHNICAL FIELD

The present invention relates to an electric motor, and particularly to an electric motor improved to suppress the occurrence of electrolytic corrosion in the bearing.

BACKGROUND ART

In recent years, an electric motor has been driven, using an inverter of a pulse width modulation system (hereinafter, referred to as a PWM system as appropriate), in many cases. When an electric motor is driven, using such an inverter of the PWM system, the neutral point potential of the winding is not zero, which causes a potential difference between the outer ring and the inner ring of the bearing (hereinafter, referred to as a shaft voltage). The shaft voltage includes a high-frequency component caused by switching. When the shaft voltage reaches the dielectric breakdown voltage of the oil film inside of the bearing, micro-current flows in the bearing and causes electrolytic corrosion inside of the bearing. When the electrolytic corrosion proceeds, a wavy abrasion phenomenon can occur on the bearing inner ring, the bearing outer ring, or bearing balls, causing abnormal sound. This is one of the major factors of failures in an electric motor.

The power supply circuit of the driving circuit (including a control circuit) for driving the electric motor, using an inverter of the PWM system, is electrically insulated from the primary circuit of the power supply circuit and the ground earth on the primary circuit side.

The conventional measures considered to suppress electrolytic corrosion are as follows:

(1) Providing electrical continuity between the bearing inner ring and the bearing outer ring;
(2) Providing electrical insulation between the bearing inner ring and the bearing outer ring; and
(3) Reducing the shaft voltage.

Examples of the specific methods for (1) include using a conductive lubricant in the bearing. However, the conductive lubricant has conductivity deteriorated with a lapse of time, and lacks sliding reliability. Alternatively, a method for disposing brushes on the rotary shaft to provide electrical continuity is considered. However, this method produces brush abrasion powder and requires a space.

Examples of the specific methods for (2) include changing the iron balls in the bearing to non-conductive ceramic balls. This method is highly effective in suppressing electrolytic corrosion, but requires high cost. Thus, this method cannot be used for general-purpose electric motors.

As a specific method for (3), the following method is conventionally known. The stator iron core and conductive metal bracket are electrically short-circuited to change the capacitance and to reduce the shaft voltage (see Patent Literature 1, for example). Also in terms of the structure of a molded motor, a structure of providing electrical continuity between the stator iron core and the conductive metal bracket is conventionally known (see Patent Literature 2, for example). Further, many of the disclosed conventional arts for suppressing electrolytic corrosion in the bearing of an electric motor include a structure where the stator iron core of the electric motor is electrically connected to the ground earth (see Patent Literature 3, for example).

The impedance when a capacitance is parallel-connected to a resistance is expressed by the following relational expression:

$$Z = 1/jwC + R$$

where Z is an impedance, j is an imaginary number, w is an angular frequency, C is a capacitance, and R is a resistance. As obvious from this expression, when the capacitance is large or the resistance is small, the impedance is low. In contrast, when the capacitance is small or the resistance is large, the impedance is high.

In Patent Literature 1, short-circuiting the stator iron core and the bracket reduces the impedance of the stator side and thereby suppresses electrolytic corrosion in the bearing.

That is, generally, an electric motor that is used in a washing machine or a dish washer/dryer, for example, installed in a wet place, and thus can cause electric shock requires independent insulation (hereinafter, referred to as additional insulation), besides the insulation in the charge part (basic insulation). On the other hand, an electric motor that is used for those except the above electric appliances, e.g. an air-conditioner indoor unit, air-conditioner outdoor unit, hot water supplier, and air cleaner, does not cause electric shock and thus requires no additional insulation. For this reason, in an electric motor used in an air-conditioner indoor unit, air-conditioner outdoor unit, hot water supplier, and air cleaner, its rotor does not have an insulated structure. Thus, the impedance of the rotor side (bearing inner-ring side) is in a low state. In contrast, the stator side (bearing outer-ring side) has an insulated structure, and thus the impedance is in a high state. In this case, while the potential on the bearing inner-ring side is high, the potential on the bearing outer-ring side is low. This unbalanced state can generate a high shaft voltage. Such a high shaft voltage can cause electrolytic corrosion in the bearing.

In order to avoid such a state, in Patent Literature 1, the stator iron core and the bracket are short-circuited to eliminate the capacitance component between them. Thereby, the impedance of the stator side (bearing outer-ring side) is reduced and approximated to the impedance of the rotor side (bearing inner-ring side).

In recent years, a molded motor has been proposed. In this type of motor, fixed members, such as a stator iron core of the stator side, is molded with a mold material to increase reliability. Then, it is considered that the bearing is fixed by such an insulating mold material, instead of a metal bracket, so that unnecessary high-frequency voltage generated on the bearing outer-ring side or unnecessary high-frequency current flowing between the inner and outer rings of the bearing are suppressed. However, since such a mold material is made of resin, its strength is not sufficiently high for fixing the bearing. Further, the resin molding provides low dimensional accuracy, and thus creep failures are likely to occur in the bearing. That is, generally in a bearing, when a gap is present between the outer ring and the inner peripheral surface of the housing, for example, a force in the radial direction is caused to the shaft by the transfer load. When such a force is generated, the relative difference in the radial direction is likely to cause a sliding phenomenon. Such a sliding phenomenon is called creep. Generally, such creep can be suppressed by securely fixing the outer ring to the housing, such as a bracket. Further, with recent increases in the output of an electric motor, more secure fixation to the bearing becomes necessary. Thus, it is essential to take creep-preventing measures, such as using a metal bracket preformed from a steel sheet with a high dimensional accuracy to fix the bearing.

Especially, it is typical that bearings journal a rotary shaft at two points. It is preferable that two bearings are fixed by metal brackets for the reasons of the above-mentioned strength and easy implementation.

However, the conventional method described in Patent Literature 1 has the following problems. First, since this conventional method is a short-circuiting method, impedance adjustment is impossible. In some magnetic materials or structures of the rotor, the shaft voltage can increase. Second, since this method reduces the impedance, it is necessary to keep the balance between the bearing inner ring and the bearing outer ring always at high potential. In such a state, the following case can be considered: when the impedance is unbalanced by the use environment of the electric motor, or variations in the assembling accuracy of the stator and the rotor, the shaft voltage increases on the contrary, which facilitates the occurrence of electrolytic corrosion.

Further, when a metal bracket is used for the reason of the above-mentioned strength, the impedance of the stator side can be lower than the impedance when the bearing is fixed by a mold material, such as insulating resin. The resin housing has high insulating performance, and thus prevents current flow between the inner ring and outer ring of the bearing. In contrast, a conductive bracket has low insulating performance and allows current flow between the inner ring and outer ring of the bearing. A case where electrolytic corrosion is likely to occur for the above reason can be considered. Further, the use of the conductive bracket reduces the impedance of the stator, so that the potentials of the bearing inner ring and the bearing outer ring both increase. This causes a problem similar to that of Patent Literature 1.

In the structure that has problems to be addressed by the present invention, as described above, the power supply circuit of the driving circuit (including a control circuit) for driving the electric motor, using an inverter of the PWM system, is electrically insulated from the primary circuit of the power supply circuit and the ground earth on the primary circuit side. For this reason, when the structure of the conventional art where the stator iron core of the electric motor is electrically connected to the ground earth is used to address the above problems, additional problems are considered to arise in terms of the specifications and characteristics of the electric motor. Thus, this approach is difficult.

[PTL1] Japanese Patent Unexamined Publication No. 2007-159302
[PTL2] Japanese Patent Publication No. 3775370
[PTL3] Japanese Patent Unexamined Publication No. 2004-242412

SUMMARY OF THE INVENTION

The present invention is directed to provide an electric motor capable of suppressing the occurrence of electrolytic corrosion in the bearing, and an electric device including the electric motor.

An electric motor of the present invention has the following elements:
  a stator having a stator iron core, the stator iron core having a winding wound thereon;
  a rotor having the following elements:
    a rotating body holding a permanent magnet in the circumferential direction so that the permanent magnet faces the stator; and
    a shaft having the rotating body fastened thereto so as to penetrate through the center of the rotating body;
    a bearing for journaling the shaft; and
    two conductive brackets for fixing the bearing.

The two brackets are electrically connected to each other, and a dielectric layer is formed between the shaft and the outer periphery of the rotating body.

This dielectric layer is an insulator for suppressing electrolytic corrosion.

With this structure, the capacitance that is caused by the dielectric layer formed between the shaft and the outer periphery of the rotating body is equivalently series-connected in the low-impedance rotor. Thus, the impedance of the rotor side can be increased. When the impedance of the rotor side is thus increased, the increased impedance can be approximated to the impedance of the stator side, which is high impedance. As a result, the high-frequency potentials on the bearing inner-ring side and the bearing outer-ring side can be equalized and balanced. Since the impedances of the stator side and the rotor side are in a high state, the potentials of the bearing inner-ring side and the bearing outer-ring side can be balanced in a low state. Thus, the shaft voltage can be suppressed without any influence of use environment, for example.

An electric device of the present invention includes the above electric motor.

As described above, in the electric motor of the present invention, the impedances of the two brackets are made equal without a considerable decrease. Further, the impedance of the rotor side (bearing inner-ring side) is increased so as to approximate to the impedance of the two brackets of the stator side (bearing outer-ring side). Thus, in the electric motor of the present invention, the high-frequency potentials of the bearing inner-ring side and the bearing outer-ring side can be balanced. With this structure, an electric motor capable of suppressing the occurrence of electrolytic corrosion in the bearing and an electric device including the electric motor can be provided.

BRIEF DESCRIPTION OF THE DRAWINGS

FIG. 10 is a chart showing evaluation results of Example 1 and Comparative Examples 1 through 4.

DETAILED DESCRIPTION OF THE PREFERRED EMBODIMENTS

Hereinafter, a description will be provided for an electric motor and electric devices including the electric motor in accordance with the present invention, with reference to the accompanying drawings.

EXAMPLE 1

Figure 1:
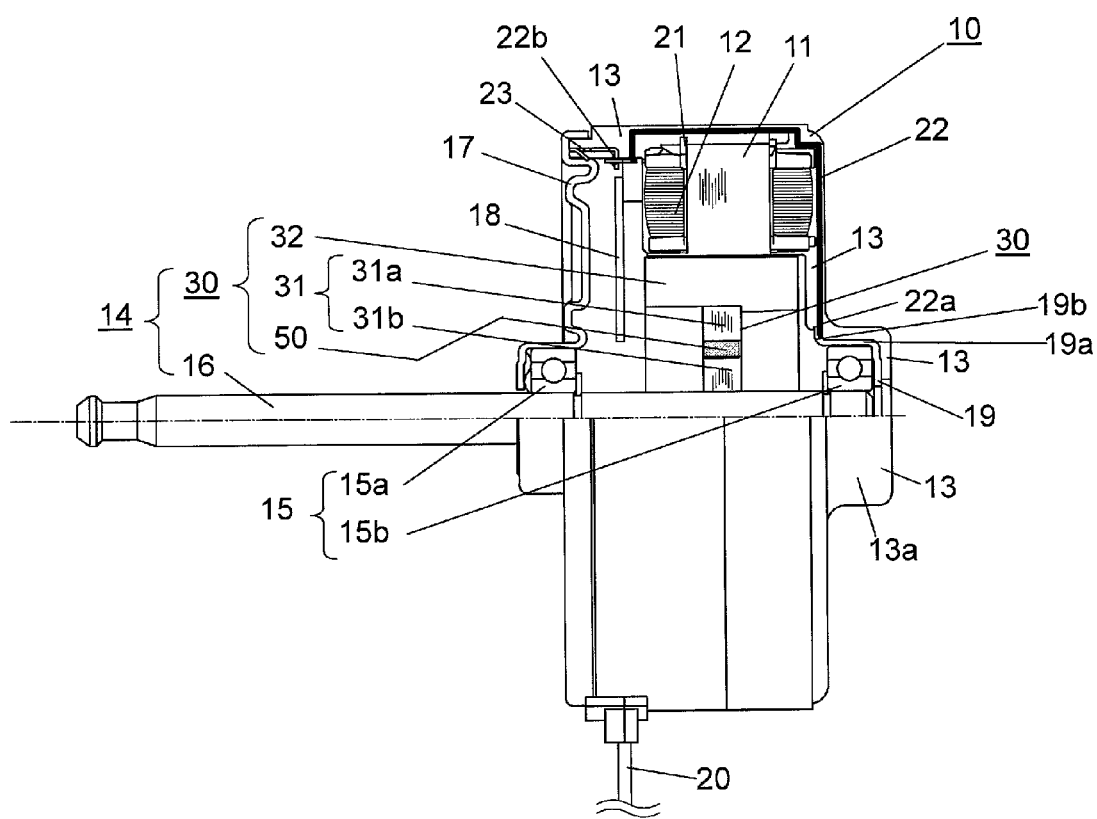
FIG. 1 is a structural diagram showing a section of a brushless motor in accordance with a first exemplary embodiment of the present invention.

FIG. 1 is a structural diagram showing a section of an electric motor in accordance with the first exemplary embodiment of the present invention. In this exemplary embodiment, as an example, a description is provided for an electric motor, i.e. a brushless motor, included in an air conditioner as an electric device, for driving a blower fan. In this exemplary embodiment, as an example, a description is provided for an inner-rotor type electric motor, in which a rotor is disposed rotatably on the inner peripheral side of a stator.

With reference to FIG. 1, stator winding 12 is wound on stator iron core 11, while resin 21, as an insulator, for insulating stator iron core 11 is interposed between the stator iron core and the winding. Such stator iron core 11 is molded with insulating resin 13, as a mold material, together with other fixing members. In this exemplary embodiment, these members are integrally molded in this manner, to form stator 10 having a substantially cylindrical contour.

On the inner side of stator 10, rotor 14 is disposed with a clearance provided between them. Rotor 14 has a disc-shaped rotating body 30 including rotor iron core 31, and has shaft 16 having rotating body 30 fastened thereto so as to penetrate through the center of rotating body 30. Rotating body 30 holds ferrite resin magnet 32, i.e. a permanent magnet, in the circumferential direction so that the magnet faces the inner peripheral side of stator 10. The detailed description will be given below. As shown in FIG. 1, rotating body 30 is structured to have outer iron core 31a, dielectric layer 50, and inner iron core 31b in this order from ferrite resin magnet 32 in the outermost peripheral part toward shaft 16 on the inner peripheral side. Outer iron core 31a forms the outer peripheral part of rotor iron core 31; inner iron core 31b forms the inner peripheral part of rotor iron core 31. FIG. 1 shows a structural example of rotating body 30 integrally formed of these rotor iron core 31, dielectric layer 50, and ferrite resin magnet 32. In this manner, the inner peripheral side of stator 10 faces the outer peripheral side of rotating body 30.

Two bearings 15 for journaling shaft 16 are attached to shaft 16 of rotor 14. Each bearing 15 is a cylindrical bearing including a plurality of iron balls, and the inner-ring side of bearing 15 is fixed to shaft 16. With reference to FIG. 1, on the output shaft side where shaft 16 projects from the brushless motor body, bearing 15a journals shaft 16. On the opposite side (hereinafter, referred to as the side opposite the output shaft side), bearing 15b journals shaft 16. In each bearing 15, the outer-ring side of bearing 15 is fixed by a conductive metal bracket. In FIG. 1, bearing 15a on the output shaft side is fixed by bracket 17, and bearing 15b opposite the output shaft side is fixed by bracket 19. With the above structure, shaft 16 is journaled by two bearings 15 so that rotor 14 is rotatable.

Further, the brushless motor incorporates printed circuit board 18 on which a driving circuit, including a control circuit, is mounted. After printed circuit board 18 is incorporated, bracket 17 is press-fitted to stator 10. Thus, the brushless motor is formed. Further, connection line 20, including lead wires for applying power supply voltage Vdc of the winding, power supply voltage Vcc of the control circuit, control voltage Vsp for controlling the number of rotations, and the ground wire of the control circuit, is connected to printed circuit board 18.

The zero potential point on printed circuit board 18 on which the driving circuit is mounted is insulated from the ground earth and the primary (power supply) circuit, and is floating from the potentials of the ground earth and the primary power supply circuit. Here, the zero potential point is the wiring of 0 V potential, as a reference potential, on printed circuit board 18, and shows a ground wiring generally called ground. The ground wire included in connection line 20 is connected to this zero potential point, i.e. the ground wiring. For example, the power supply circuit for supplying the power supply voltage of the winding, the power supply circuit for supplying the power supply voltage of the control circuit, the lead wire for applying the control voltage, and the ground wire of the control circuit are connected to printed circuit board 18 on which the driving circuit is mounted, and are electrically insulated from the ground earth. That is, these power supply circuits, for example, are electrically insulated from any of the primary (power supply) circuit with respect to the power supply circuit for supplying the power supply voltage of the winding, the primary (power supply) circuit with respect to the power supply circuit for supplying the power supply voltage of the control circuit, the ground earth connected to these primary (power supply) circuits, and independently grounded earth. In short, the driving circuit mounted on printed circuit board 18 is electrically insulated from the potentials of the primary (power supply) circuits and the ground earth. Thus, the potential of the driving circuit is floating. This state is also expressed as a floating potential, which is known well. For this reason, the structure of each of the power supply circuit for supplying the power supply voltage of the winding, and the power supply circuit for supplying the power supply voltage of the control circuit to be connected to printed circuit board 18 is also referred to as a floating power supply, which is also a well-known expression.

The respective power supply voltages and control signals are supplied, via connection line 20, to the brushless motor structured as above. Thereby, stator winding 12 is driven by the driving circuit on printed circuit board 18. When stator winding 12 is driven, drive current flows through stator winding 12, and stator iron core 11 generates a magnetic field. Then, the magnetic field from stator iron core 11 and the magnetic field from ferrite resin magnet 32 generate an attractive force and a repulsive force, depending on the polarities of the magnetic fields. With these forces, rotor 14 rotates around shaft 16 at the center.

Next, the detailed structure of the brushless motor is described.

First, in the brushless motor, as described above, shaft 16 is journaled by two bearings 15, and each bearing 15 is fixed and supported by a bracket. Further, in this exemplary embodiment, in order to suppress failures caused by creep as described above, each bearing 15 is fixed by a conductive metal bracket. That is, in this exemplary embodiment, the conductive brackets preformed from a steel sheet with a high dimensional accuracy are used for fixation of bearings 15.

Especially when higher output of the electric motor is demanded, this structure is more preferable.

Specifically, bearing 15b opposite the output shaft side is fixed by bracket 19 having an outer circumference substantially equal to the outer circumference of bearing 15b. This bracket 19 is integrally molded with insulating resin 13. That is, as shown in FIG. 1, insulating resin 13 opposite the output shaft side is shaped to have body protruding part 13a protruding from the brushless motor body in the direction opposite the output shaft. On the inner side of body protruding part 13a, bracket 19 is disposed as an inner bracket and integrally molded with insulating resin 13. Bracket 19 has a cup shape formed into a hollow cylinder. More specifically, the bracket has cylindrical portion 19a open on one side, and annular flange portion 19b slightly spreading in the outward direction from the cylindrical end on the open side. The inner circumference of cylindrical portion 19a is substantially equal to the outer circumference of bearing 15b. Bearing 15b is press-fitted into cylindrical portion 19a, and thereby bearing 15b is also fixed to insulating resin 13 via bracket 19. With this structure, the outer-ring side of bearing 15b is fixed to metal bracket 19, so that failures caused by creep can be suppressed. The outer circumference of flange portion 19b is slightly larger than the outer circumference of bearing 15b. That is, the outer circumference of flange portion 19b is larger than the outer circumference of bearing 15b and smaller than the outer circumference of rotating body 30. Forming bracket 19 into such a shape reduces the use of the metal material of high cost in comparison to the structure where the flange portion extends beyond the outer periphery of rotating body 30 to stator 10, for example. In addition to the reduction of the area of metal bracket 19 in this manner, insulating resin 13 is integrally molded so as to cover the outer shell of bracket 19. Thus, the noise generated from bearing 15b can also be suppressed.

Next, bearing 15a on the output shaft side is fixed by bracket 17 having an outer circumference substantially equal to the outer circumference of stator 10. Bracket 17 has a substantially disc shape, and has a protruding part having a diameter substantially equal to that of the outer circumference of bearing 15a, in the center of the disc shape. This protruding part has a hollow inside. After printed circuit board 18 is incorporated, the inside of the protruding part of bracket 17 thus formed is press-fitted to bearing 15a. Further, bracket 17 is press-fitted to stator 10 so that the connection end formed on the outer periphery of bracket 17 fits to the connection end of stator 10. Thus, the brushless motor is formed. With such a structure, the assembling work is facilitated and the outer-ring side of bearing 15a is fixed to metal bracket 17. Thus, failures caused by creep are suppressed.

Conductive pin 22 is electrically connected to bracket 19 in advance. That is, as shown in FIG. 1, one end 22a of conductive pin 22 is connected to flange portion 19b of bracket 19. Conductive pin 22 is disposed inside of insulating resin 13, and integrally molded with insulating resin 13, similarly to bracket 19. Conductive pin 22 is disposed inside of insulating resin 13, i.e. inside of the electric motor. With this structure, conductive pin 22 is prevented from rust and external forces, and an electrical connection highly reliable for use environment and external stress is provided. Conductive pin 22 extends inside of insulating resin 13 from flange portion 19b toward the outer periphery of the brushless motor and further extends in substantially parallel with shaft 16 from the vicinity of the outer periphery of the brushless motor toward the output shaft side. The other end 22b of conductive pin 22 is exposed from the end face of insulating resin 13 on the output shaft side. Further, conductive pin 23 for electrically connecting conductive pin 22 to bracket 17 is connected to end 22b. That is, when bracket 17 is press-fitted to stator 10, conductive pin 23 is brought into contact with bracket 17 and electrical continuity is ensured between bracket 17 and conductive pin 23. With such a structure, two brackets, i.e. bracket 17 and bracket 19, are electrically connected via conductive pin 22. Further, with bracket 17 and bracket 19 insulated from stator iron core 11 by insulating resin 13, these two bracket are electrically connected to each other.

Further, in this exemplary embodiment, in rotating body 30, dielectric layer 50 is formed between shaft 16 and the outer periphery of rotating body 30.

Figure 2:
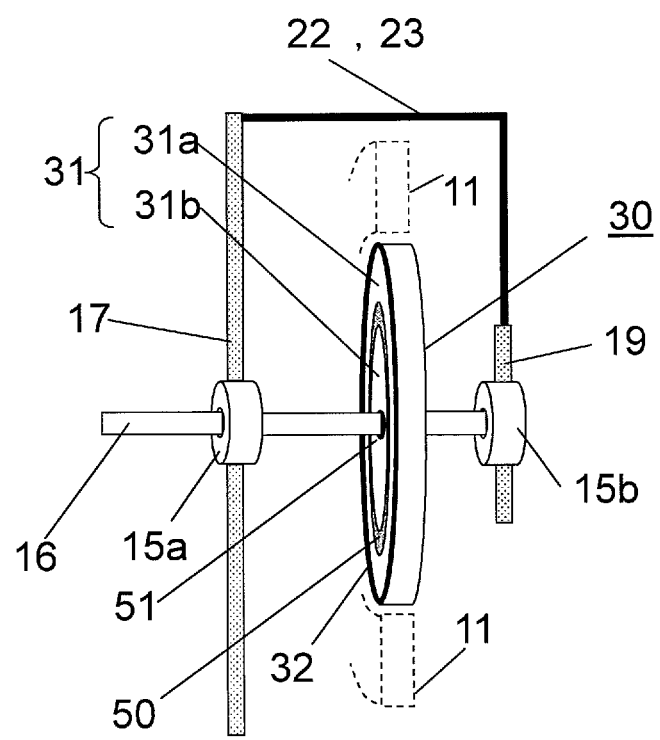
FIG. 2 is a diagram schematically showing an essential part of the motor.

FIG. 2 is a diagram schematically showing an essential part of the brushless motor of FIG. 1. As shown in FIG. 2, bracket 17 and bracket 19 are electrically connected to each other, and are not connected to stator core 11.

If bracket 17 and bracket 19 are not connected, both brackets have different impedances because they are different in shape and arrangement. This unbalances the potential induced in bracket 17 and the potential induced in bracket 19. It is considered that this potential unbalance makes high-frequency current likely to flow via shaft 16, from the output shaft side to the side opposite the output shaft side, or vice versa.

In this exemplary embodiment, electrically connecting bracket 17 and bracket 19 makes both brackets at an equal potential, suppresses the potential unbalance, and prevents high-frequency current from flowing via shaft 16.

If conductive pin 22 for connecting bracket 17 and bracket 19 is also connected to stator iron core 11, the impedance of the stator side decreases. When the impedance becomes low, the potential of the stator side, i.e. the outer-ring side of the bearing becomes high, as described above. To address this problem, in this exemplary embodiment, conductive pin 22 is insulated from stator iron core 11. This structure suppresses the decrease in the impedance and keeps the potential of the bearing outer-ring side low. As will be described below, this structure makes it easy to balance the impedance of the stator side and the impedance of the rotor side. Further, in this exemplary embodiment, as described above, simply press-fitting bracket 17 to stator 10 allows electrical connection of bracket 17 and bracket 19 with insulation between the brackets and stator iron core 11 ensured. Thus, in the manufacturing process, both brackets can be made at an equal potential easily while the decrease in the impedance of the stator side is suppressed.

Next, as shown in FIG. 2, in rotating body 30, ferrite resin magnet 32 is formed in the outermost peripheral part. Further, outer iron core 31a constituting rotor iron core 31, dielectric layer 50, and inner iron core 31b constituting rotor iron core 31 are formed in this order toward the inner peripheral side. Dielectric layer 50 is a layer formed of an insulating resin. In this exemplary embodiment, such dielectric layer 50 is formed to suppress electrolytic corrosion. FIG. 2 shows an example where dielectric layer 50 is formed between the inner peripheral side and the outer peripheral side of rotating body 30 in a ring shape circling around shaft 16. In this manner, rotating body 30 is integrally formed of ferrite resin magnet 32, outer iron core 31a, an insulating resin forming dielectric layer 50, and inner iron core 31b. In fastening part 51 on the inner periphery of inner iron core 31b, rotating body 30 is fastened to shaft 16. Thus, rotor 14 to be journaled with bearings 15 is formed.

In rotating body 30, dielectric layer 50 is a layer formed of an insulating resin, i.e. an insulator, and insulatively separates outer iron core 31a and inner iron core 31b in series. On the other hand, dielectric layer 50 is formed of an insulating resin having a predetermined dielectric constant, and high-frequency current can flow between outer iron core 31a and inner iron core 31b.

If such dielectric layer 50 is not formed, the impedance between the brackets with respect to the stator iron core is high and, in contrast, the impedance between the shafts electrically connected to the rotating body is low, as described above. For example, PWM high-frequency current generated from the stator iron core, flows into the equivalent circuit having such impedance components. The high-frequency current can cause a potential difference between the outer rings electrically connected to the brackets and the shaft on the bearing inner-ring side.

In this exemplary embodiment, dielectric layer 50 as shown in FIG. 2 is formed in the rotating body of the rotor having low impedance. Thereby, the impedance of rotor 14 is increased so as to approximate to the impedance of the bracket side. That is, forming dielectric layer 50 between outer iron core 31a and inner iron core 31b makes rotor 14 have a structure where the capacitance caused by dielectric layer 50 is equivalently series-connected. Thus, the impedance of rotor 14 can be increased. The increased impedance of rotor 14 increases the voltage drop in the high-frequency waves flowing from rotor 14 to shaft 16, thereby reducing the potential generated in shaft 16 by the high-frequency current. According to such a principle, in the brushless motor of this exemplary embodiment, the potential difference caused by the high-frequency current between the outer rings of bearings 15 electrically connected to bracket 17 and bracket 19 and shaft 16 on the inner-ring sides of bearings 15 is decreased. Further, as described above, in this exemplary embodiment, brackets 17 and 19 are insulated from stator iron core 11. This state suppresses the decrease in the impedance of brackets 17 and 19 and keeps the impedance of brackets 17 and 19 in a high state. Thus, the bearing inner rings and the bearing outer rings are balanced so as to be kept at a low potential with a low potential difference. This state suppresses the occurrence of electrolytic corrosion in the bearings.

Further, in this exemplary embodiment, bracket 17 and bracket 19 are electrically connected via conductive pin 22. This makes both brackets at an equal potential and suppresses the flow of the high-frequency current via the shaft. Further, by making both brackets at an equal potential, the potential difference between the inner ring and the outer ring of bearing 15a is approximated or equalized to the potential difference between the inner ring and the outer ring of bearing 15b. In this structure, appropriately adjusting the impedance of the rotor side, using dielectric layer 50, can reduce the potential difference between the inner ring and the outer ring, i.e. the shaft voltage, in each of bearing 15a and bearing 15b. Thus, a failure where electrolytic corrosion is suppressed in one bearing but occurs in the other bearing can be prevented. In this manner, in each of two bearings fixed by conductive brackets, the potential difference between the inner ring and the outer ring of the bearing can be reduced. Thereby, while the fixing strength of the bearing is ensured, the occurrence of electrolytic corrosion in the bearing caused by high-frequency waves resulting from PWM, for example, can be suppressed.

Further, the capacitance can be varied by changing the width or material of dielectric layer 50. Thus, the impedance of the side of rotor 14 can be set optimally. That is, the capacitance caused by dielectric layer 50 can be reduced by the following method: reducing the dielectric constant of the insulating resin forming dielectric layer 50, increasing the thickness of the insulating resin (interelectrode distance), or reducing the electrode area, for example. By reducing the capacitance caused by dielectric layer 50 in this manner, the impedance of rotor 14 can be increased.

The use of syndiotactic polystyrene (hereinafter, SPS) resin as an insulating resin forming dielectric layer 50 can reduce the dielectric constant. Thus, even with an insulating resin having a small thickness, the impedance of rotor 14 can be increased. Typically, as an insulating resin used for an electric motor, polybutylene terephthalate (hereinafter, PBT) resin or polyethylene terephthalate (hereinafter, PET) resin, for example, is reinforced by inorganic filler, e.g. glass fiber. The dielectric constant of such material is approximately 3.5. In contrast, SPS resin has a dielectric constant lower than that of general resin: the dielectric constant is 2.6 for a non-reinforced product, and 2.8 for a reinforced product. Therefore, when the upper limit of the thickness of the insulating resin is restricted by the structure and PBT resin cannot provide sufficiently high impedance, the use of SPS resin can reduce the capacitance.

Further, as shown in FIG. 2, rotating body 30 is structured so that dielectric layer 50 separates outer iron core 31a and inner iron core 31b. With this structure, in the manufacturing process, the rotor iron core and the insulating resin can be integrally formed without shaft 16 attached. Thus, in the structure of FIG. 2, rotating body 30 can be formed without a shaft attached, and thus the productivity can be enhanced in comparison to the structure where the dielectric layer is formed between the shaft and the rotor iron core. Further, in the structure of FIG. 2, even shaft 16 of a different type can be fixed by caulking or press-fitting. Thus, this structure can facilitate the changeover of the types, and enhance the productivity.

Figure 3:
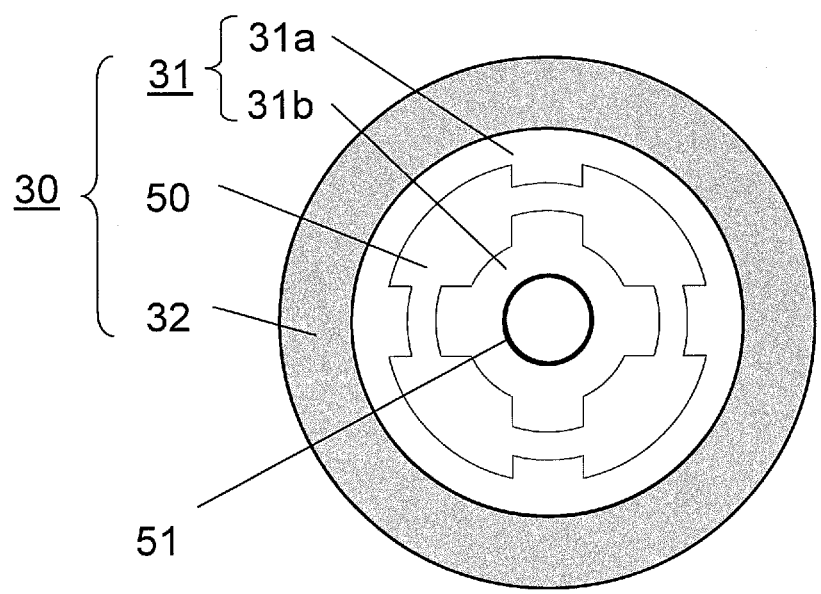
FIG. 3 is a diagram showing a specific structural example of a rotating body of the motor.

FIG. 3 is a diagram showing a specific structural example of a rotating body of the brushless motor in accordance with the first exemplary embodiment of the present invention. FIG. 3 shows a structural example where the rotating body is viewed from the top. The rotating body of FIG. 3 has dielectric layer 50 in a shape where a plurality of types of arc having different radial widths is combined, between outer iron core 31a and inner iron core 31b in the radial direction. That is, dielectric layer 50 has a shape where a convex projection and a concave projection are repeated in a circle on at least either of the outer peripheral side and the inner peripheral side. Outer iron core 31a and inner iron core 31b fit to dielectric layer 50 in such a shape.

If dielectric layer 50 is shaped into a complete ring as shown in FIG. 2, a slip can occur during rotation. In contrast, when dielectric layer 50 is formed into the shape of FIG. 3, slip-preventing projections are interposed between dielectric layer 50 and the iron core. This structure not only prevents a slip but also enhances the rotational strength. More specifically, slip-preventing projections are formed in each of outer iron core 31a and inner iron core 31b so that the corresponding projections face each other.

Figure 4:
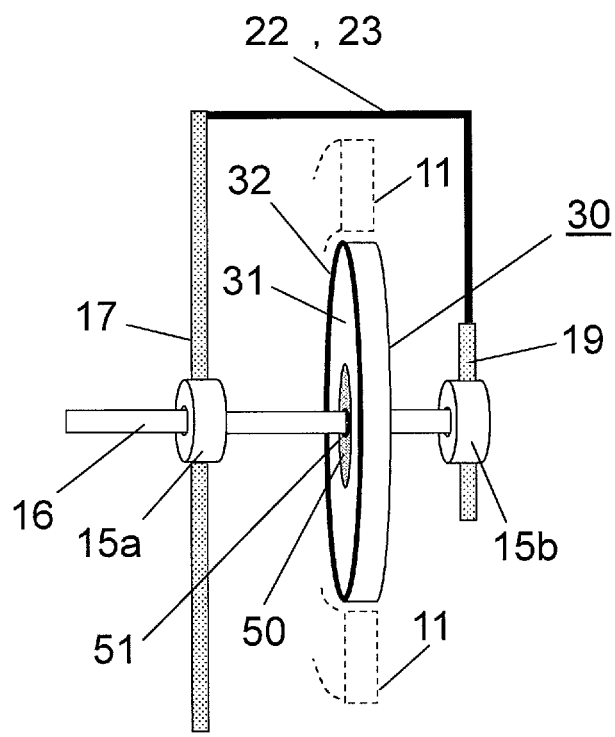
FIG. 4 is a diagram showing another structural example of a rotor of the motor.

FIG. 4 is a diagram showing another structural example of a rotor of the brushless motor in accordance with the first exemplary embodiment of the present invention.

In rotating body 30 of FIG. 4, ferrite resin magnet 32 is formed in the outermost peripheral part. Further, rotor iron core 31, and dielectric layer 50 of an insulating resin are formed in this order toward the inner peripheral side. In this manner, rotating body 30 of FIG. 4 is integrally formed of ferrite resin magnet 32, rotor iron core 31, and the insulating rein forming dielectric layer 50. In fastening part 50 on the inner periphery of dielectric layer 50, rotating body 30 is fastened to shaft 16. That is, rotating body 30 is fastened to shaft 16 via dielectric layer 50. Rotor 14 also may have such a structure. In this structure, the capacitance caused by dielectric layer 50 is series-connected between rotor iron core 31 and shaft 16, and the impedance of rotor 14 can be increased.

Hereinafter, the present invention will be specifically described with reference to examples. The present invention is not limited to the following examples. The present invention is not limited by these examples as long as the points of the present invention are not changed.

EXAMPLE 1

Rotors structured as shown in FIG. 3 were fabricated, using PBT resin having a dielectric constant of 3.6 and SPS resin having a dielectric constant of 2.8 as the dielectric layers so that the minimum resin thickness was 2.5 mm. Brushless motors including the rotors and structured as shown in FIG. 1 were fabricated, and their shaft voltages were measured.

Throughout the measurement, one stator was used, and the respective rotors were interchanged. As the bearing, Minebea 608 (with grease having a consistency of 239) was used.

Figure 5:
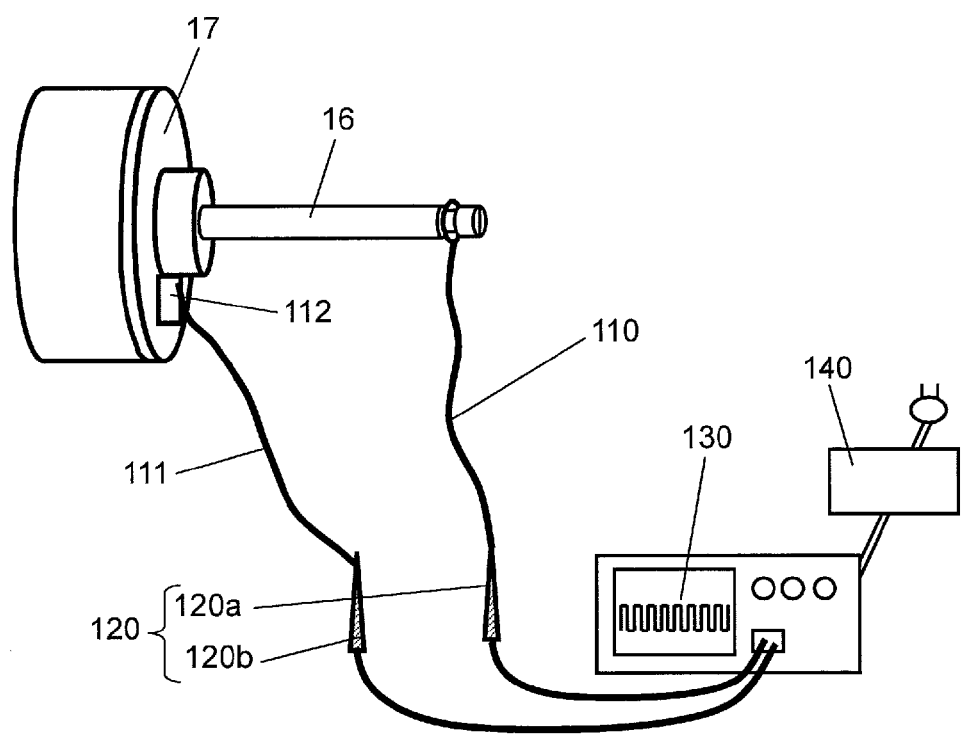
FIG. 5 is a drawing showing a method for measuring a shaft voltage in Example 1.

FIG. 5 is a drawing showing a method for measuring the shaft voltage of Example 1. During measurement of the shaft voltage, a direct-current stabilized power supply was used. The measurement was performed under the same operating conditions as follows: power supply voltage Vdc of the winding set to 391V; power supply voltage Vcc of the control circuit set to 15V; and the number of rotations set to 1000 r/min. The number of rotations was adjusted at control voltage Vsp, and the shaft of each brushless motor during operation was horizontal.

For the measurement of the shaft voltage, voltage waveforms were monitored with digital oscilloscope 130 (Tektronix DPO7104) and high-voltage differential probe 120 (Tektronix P5205), and checked for any waveform deformation. The voltage measured between the peaks was determined to be the shaft voltage.

The waveform deformation was classified into the following three types: complete waveform deformation; partly waveform deformation; and no waveform deformation.

Figure 6:
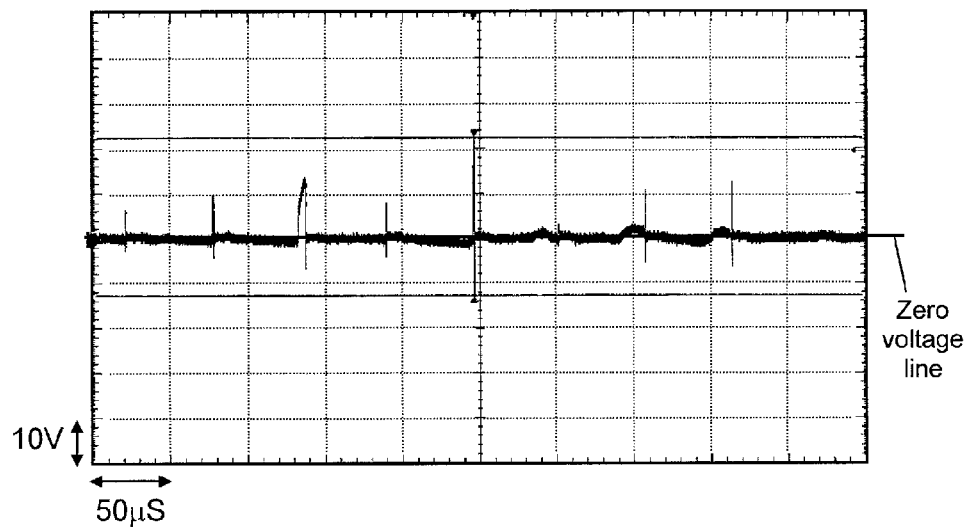
FIG. 6 is a chart showing an example of complete waveform deformation.
Figure 7:
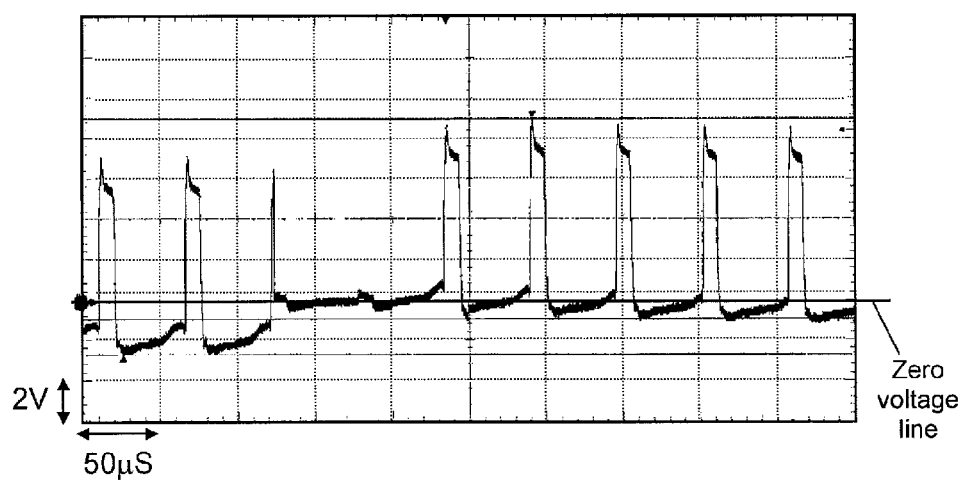
FIG. 7 is a chart showing an example of partial waveform deformation.
Figure 8:
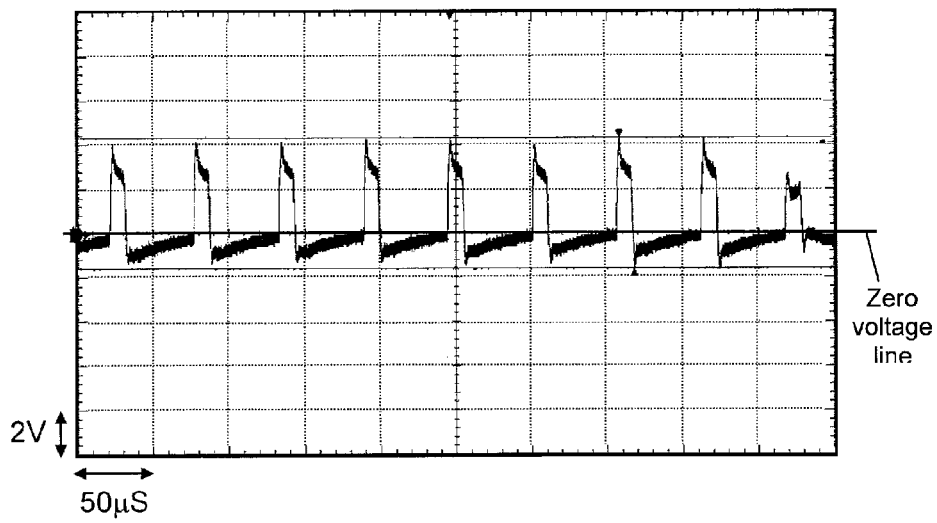
FIG. 8 is a chart showing an example of no waveform deformation.

FIG. 6 through FIG. 8 are charts showing examples of such waveform deformation. FIG. 6 shows a waveform of complete waveform deformation, FIG. 7 shows that of partly waveform deformation, and FIG. 8 shows that of no waveform deformation. In FIG. 6 through FIG. 8, the time along the horizontal axis during the measurement is under the same condition, which is 50 □s/div. Digital oscilloscope 130 was insulated by isolation transformer 140.

Positive side 120a of high-voltage differential probe 120 was electrically connected to shaft 16 via lead wire 110 approximately 30 cm long in the following manner. The conductor of the lead wire was formed into a loop shape having a diameter of approximately 15 mm, and the inner periphery of the loop was brought into conductive contact with the outer periphery of shaft 16. Negative side 120b of high-voltage differential probe 120 was electrically connected to bracket 17 via lead wire 111 approximately 30 cm long, by bringing the tip of lead wire 111 conductive contact with bracket 17 via conductive tape 112. With such a structure, the voltage between bracket 17 and shaft 16, i.e. the shaft voltage of bearing 15a on the output shaft side, was measured.

Similarly, the shaft voltage of bearing 15b opposite the output shaft side was measured. Positive side 120a of high-voltage differential probe 120 was electrically connected to shaft 16 via lead wire 110 approximately 30 cm long in the following manner. The conductor of the lead wire was formed into a loop shape having a diameter of approximately 15 mm, and the inner periphery of the loop was brought into conductive contact with the outer periphery of shaft 16. Negative side 120b of high-voltage differential probe 120 was electrically connected to bracket 19 via lead wire 111 approximately 30 cm long in the following manner. The resin portion was partly cut to expose a part of bracket 19, and the tip of lead wire 111 was brought into conductive contact with the exposed part of bracket 19 via conductive tape 112.

Figure 9:
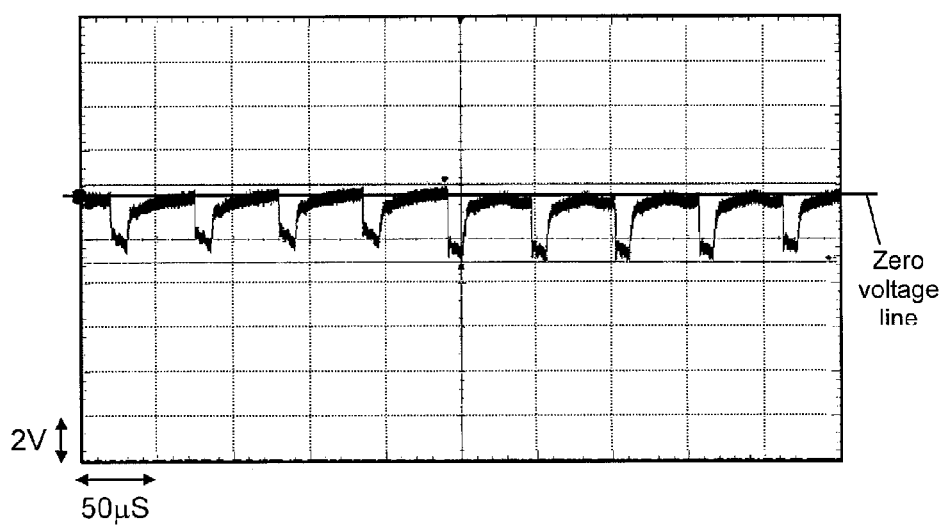
FIG. 9 is a chart showing a waveform of a shaft voltage when a current direction is from a bearing outer ring to a bearing inner ring.

The current direction was determined according to the direction of the shaft voltage waveform. The voltage waveforms of FIG. 6 through FIG. 8 are above the zero voltage line. This shows the potential of the side of shaft 16 (the bearing inner ring) is higher than that of the side of bracket 17 or bracket 19 (the bearing outer ring). Therefore, as for the current direction, it is determined that the current follows from the bearing inner-ring side toward the bearing outer-ring side. In contrast, when the voltage waveform is below the zero voltage line as shown in FIG. 9, it is determined that the current follows from the bearing outer-ring side toward the bearing inner-ring side.

The impedance was measured using LCR meter ZM2353 and test lead 2325A of NF Corporation, in the following manner. In connection line 20, lead wires for applying power supply voltage Vdc of the winding, power supply voltage Vcc of the control circuit, and control voltage Vsp for controlling the number of rotations, and the ground wire of the control circuit were short-circuited and bound. The impedance between these bound wires (hereinafter, referred to as power supply lead wires) and bracket 17 on the output shaft side (hereinafter, impedance of bracket on output shaft side), the impedance between the power supply lead wires and bracket 19 opposite the output shaft side (hereinafter, impedance of bracket opposite output shaft side), and the impedance between the power supply lead wires and shaft 16 (hereinafter impedance of rotor side) were measured. The measurement was performed at a voltage of 1 V and a frequency of 10 kHz so that the shaft of the brushless motor was horizontal. The measurement was performed without rotation, and thus electrical continuity was provided between the shaft and the brackets. To prevent this state, insulation was provided between the shaft and the brackets in a simulative manner for measurement of the impedances. Specifically, bearings that include ceramic balls, i.e. an insulator, instead of metal balls, i.e. a conductor, were used for the impedance measurement.

Further, in order to validate the effect of suppressing electrolytic corrosion under the above specifications, each brushless motor was prepared, and the electrolytic corrosion suppressing effect was validated in electrolytic corrosion tests.

The electrolytic corrosion tests were conducted under the following conditions: power supply voltage Vdc of the winding set to 391 V; power supply voltage Vcc of the control circuit set to 15V; the number of rotations set to 1000 r/min (adjusted at control voltage Vsp); the shaft of the brushless motor positioned horizontal; the ambient temperature set to 10° C.; and no load.

Further, in order to accelerate electrolytic corrosion more than usual, special bearings in each of which only one out of seven iron balls was left and the remaining balls were replaced with ceramic balls were installed.

As the determination of electrolytic corrosion, the life against electrolytic corrosion was determined when audible abnormality and wavy abrasion inside of the bearings were confirmed.

COMPARATIVE EXAMPLE 1

A rotor identical in shape with that of FIG. 3 where outer iron core 31a was not insulated from inner iron core 31b was used. With this rotor, a brushless motor identical in shape with that of FIG. 1 was fabricated so that bracket 17 and bracket 19 were not electrically connected. The brushless motor was evaluated in a manner similar to that of Example 1.

COMPARATIVE EXAMPLE 2

A rotor identical in shape with that of FIG. 3 where outer iron core 31a was not insulated from inner iron core 31b was used. With this rotor, a brushless motor identical in shape with that of FIG. 1 was fabricated so that bracket 17 and bracket 19 were electrically connected. The brushless motor was evaluated in a manner similar to that of Example 1.

COMPARATIVE EXAMPLE 3

A rotor identical in shape with that of FIG. 3 was fabricated, using PBT resin as dielectric layer 50. With this rotor, a brushless motor identical in shape with that of FIG. 1 was fabricated so that bracket 17 and bracket 19 were not electrically connected. The brushless motor was evaluated in a manner similar to that of Example 1.

COMPARATIVE EXAMPLE 4

A rotor identical in shape with that of FIG. 3 was fabricated, using SPS resin as dielectric layer 50. With this rotor, a brushless motor identical in shape with that of FIG. 1 was fabricated so that bracket 17 and bracket 19 were not electrically connected. The brushless motor was evaluated in a manner similar to that of Example 1.

FIG. 10 is a chart showing evaluation results of Example 1 and Comparative Examples 1 through 4.

As obvious from FIG. 10, forming dielectric layer 50 has increased the impedance of rotor side. Further, the impedance of rotor side can be matched to the impedance of bracket on output shaft side and the impedance of bracket opposite output shaft side, and thus the shaft voltage can be reduced. When the impedance of rotor side is adjusted so as to be approximately twice the impedance of bracket on output shaft side or the impedance of bracket opposite output shaft side, these impedances can be matched, and thus the shaft voltage is reduced. This is considered for the following reason. The impedance of rotor side is connected in parallel with the impedance of bracket on output shaft side and the impedance of bracket opposite output shaft side. Thus, even when each of the impedance of bracket on output shaft side and the impedance of bracket opposite output shaft side is approximately 50% of the impedance of rotor side, these impedances can be matched. The impedance at 10 kHz is lower than (approximately 1/10) the impedance at 1 kHz, and is higher than (approximately 10 times) the impedance at 100 kHz. Because no resonance point of impedance is confirmed in the range of 1 kHz to 100 kHz, it is considered that the capacitive component is dominant over the inductive component in the impedance components in this frequency range.

Lowering the shaft voltage has extremely reduced the number of waveform deformations (dielectric breakdown voltage of the oil film inside of the bearing). The effect of suppressing the occurrence of electrolytic corrosion in the bearing can be enhanced. Further, by electrically connecting bracket 17 and bracket 19, the impedance of bracket on output shaft side and the impedance of bracket opposite output shaft side are synthesized to serve as one impedance. Thus, current flows in the same direction, and bracket 17 and bracket 19 are at an equal potential, so that no current flows via shaft 16. For this reason, the effect of suppressing the occurrence of electrolytic corrosion in the bearings can be enhanced. Further, SPS resin used as an insulating material can provide higher impedance than PBT resin with the same insulation thickness.

Also in the electrolytic corrosion tests, forming dielectric layer 50 and electrically connecting bracket 17 and bracket 19 can make the life against electrolytic corrosion approximately two to six times.

As obvious from these results, the electric motor of the present invention has a reduced shaft voltage and is effective in suppressing the occurrence of electrolytic corrosion in the bearings of the electric motor in comparison to conventional electric motors.

As described above, the electric motor of the present invention has the following elements:
  a stator having a stator iron core, the stator iron core having a winding wound thereon;
  a rotor having the following elements:
    a rotating body holding a permanent magnet in the circumferential direction so that the permanent magnet faces the stator; and
    a shaft having the rotating body fastened thereto so as to penetrate through the center of the rotating body;
  a bearing for journaling the shaft; and
  two conductive brackets for fixing the bearing.

The two brackets are electrically connected to each other, and a dielectric layer is formed between the shaft and the outer periphery of the rotating body. This structure makes the bearing outer ring on the output shaft side and the bearing outer ring opposite the output shaft side at an equal potential, and can form a circuit where no current flows between the bearing on the output shaft side and the bearing opposite the output shaft side. Further, since the impedances of the outer-ring sides of the two bearings are synthesized into one impedance, the impedance can be easily approximated to the impedance of the bearing inner-ring side. Further, the capacitance caused by the dielectric layer formed between the shaft and the outer periphery of the rotating body is equivalently series-connected in the low-impedance rotor. Thus, the impedance of the rotor side can be increased. As a result, the impedance of the bearing inner-ring side can be approximated to the impedance of the bearing outer-ring side. Thus, the high-frequency potentials on the bearing inner-ring side and the bearing outer-ring side can be balanced, and the occurrence of electrolytic corrosion in the bearing caused by high-frequency waves resulting from PWM, for example, can be suppressed. Therefore, the present invention can provide an electric motor capable of suppressing the occurrence of electrolytic corrosion in the bearing. Further, by incorporating the electric motor of the present invention into an electric device, an electric device including the electric motor capable of suppressing the occurrence of electrolytic corrosion in the bearing can be provided.

In this exemplary embodiment, the description has been provided, using the shapes shown in FIG. 1 through FIG. 4 as examples of the shape of the dielectric layer. Other shapes may be used as long as the capacitance caused by the dielectric layer can increase the impedance of the rotor.

Figure 11:
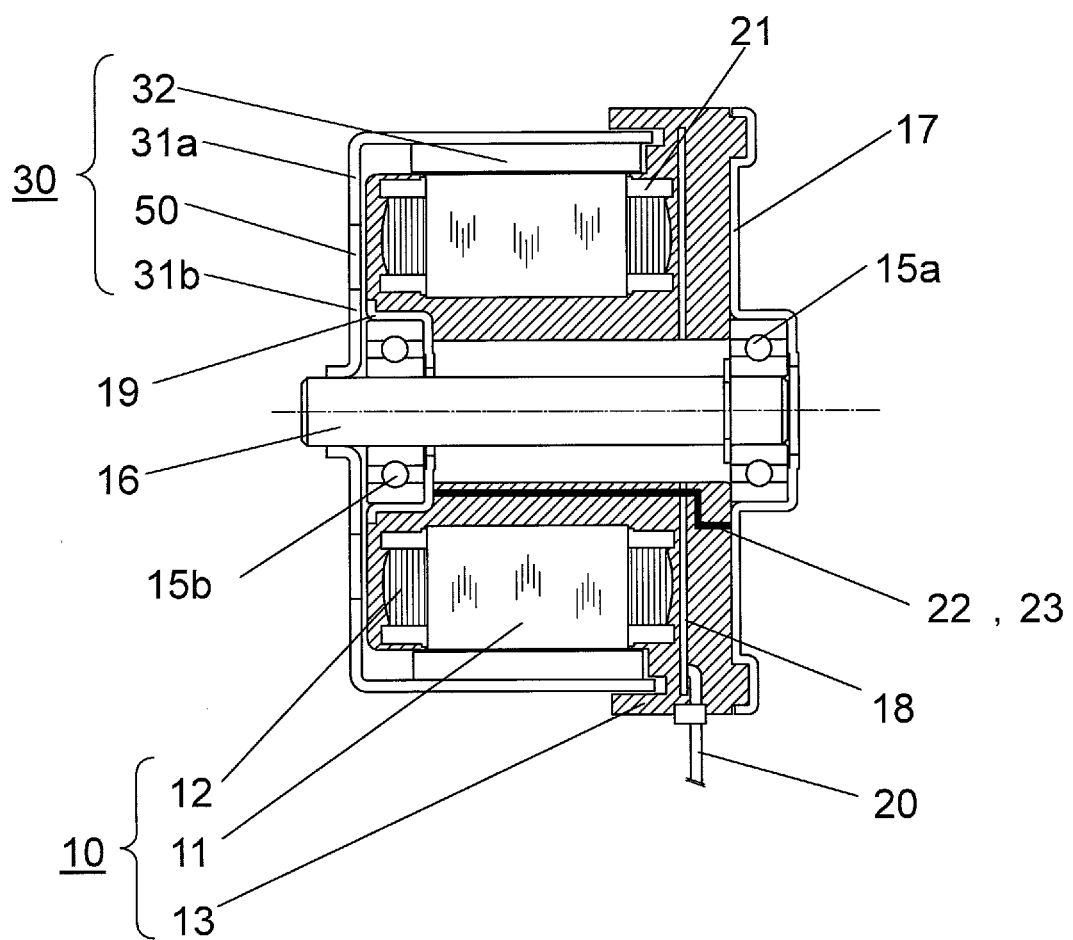
FIG. 11 is a structural diagram showing a section of an outer-rotor type electric motor as another structural example in accordance with the first exemplary embodiment.

Further, the description has been provided, using an inner-rotor type brushless motor, in which the rotor is disposed rotatably on the inner peripheral side of the stator, as an example. The present invention can also be applied to an outer-rotor type electric motor, in which the rotor is disposed rotatably on the outer peripheral side of the stator. FIG. 11 is a structural diagram showing a section of an outer-rotor type electric motor as another structural example of this exemplary embodiment. In FIG. 11, the elements similar to those of FIG. 1 are denoted with the same reference signs. With reference to FIG. 11, stator iron core 11 having stator winding 12 wound thereon is molded with insulating resin 13 to form stator 10. Further, stator 10 is integrally formed with bracket 17 and bracket 19. Bearing 15a is fixed to bracket 17, and bearing 15b is fixed to bracket 19. Shaft 16 penetrates through the inner-ring sides of bearing 15a and bearing 15b. Rotating body 30 in a hollow cylindrical shape is fastened to one end of shaft 16. Further, stator iron core 11 is disposed in the hollow part of rotating body 30 on the inner peripheral side. In rotating body 30, annular dielectric layer 50 is formed so as to be interposed between outer iron core 31a and inner iron core 31b. Bearing 15a and bearing 15b are electrically connected via conductive pin 22, for example. Also in such an outer-rotor type electric motor, similar advantages can be obtained by forming dielectric layer 50 and providing a structure of electrical connection of bracket 17 and bracket 19 as shown in FIG. 11 in a structure similar to that of FIG. 1.

EXAMPLE 2

As an example of an electric device of the present invention, first, the structure of an air-conditioner indoor unit is detailed, as the second exemplary embodiment.

Figure 12:
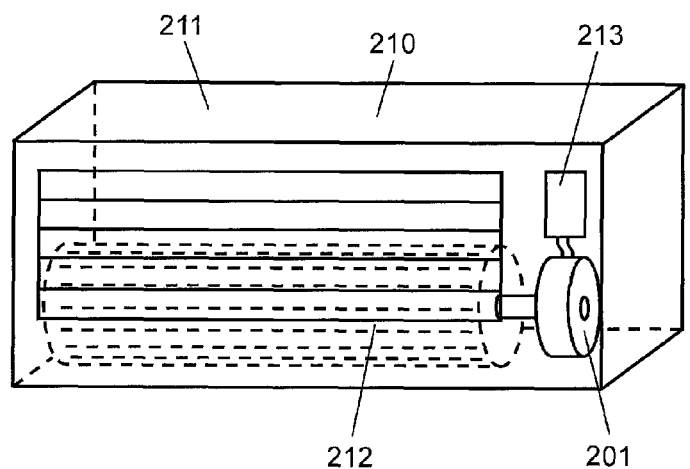
FIG. 12 is a structural diagram of an electric device (air-conditioner indoor unit) in accordance with a second exemplary embodiment of the present invention.

With reference to FIG. 12, electric motor 201 is included in case 211 of air-conditioner indoor unit 210. Cross flow fan 212 is attached to the rotary shaft of electric motor 201. Electric motor 201 is driven by electric motor drive unit 213. By energization of electric motor drive unit 213, electric motor 201 is rotated, and thereby cross flow fan 212 is rotated. By the rotation of cross flow fan 212, air conditioned by the heat exchanger for the indoor unit (not shown) is blown into the room. As electric motor 201, the above electric motor of the first exemplary embodiment, for example, can be used.

The electric device of the present invention has an electric motor, and a case including the electric motor. As the electric motor, the electric device uses the electric motor of the present invention structured as above.

EXAMPLE 3

As an example of an electric device of the present invention, next, the structure of an air-conditioner outdoor unit is detailed, as the third exemplary embodiment.

Figure 13:
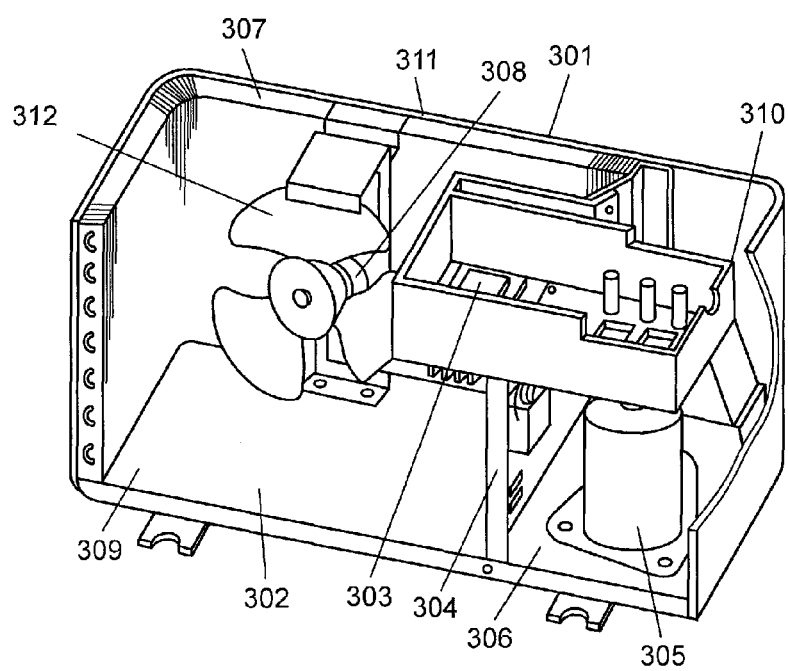
FIG. 13 is a structural diagram of an electric device (air-conditioner outdoor unit) in accordance with a third exemplary embodiment of the present invention.

With reference to FIG. 13, air-conditioner outdoor unit 301 includes electric motor 308 inside of case 311. Electric motor 308 has fan 312 attached to the rotary shaft, and serves as a blower motor.

Air-conditioner outdoor unit 301 is partitioned into compressor chamber 306 and heat-exchanger chamber 309 by partition plate 304 standing on base plate 302 of case 311. Compressor 305 is disposed in compressor chamber 306. Heat exchanger 307 and the above blower motor are disposed in heat-exchanger chamber 309. Electrical component box 310 is disposed above partition plate 304.

In the blower motor, fan 312 is rotated by the rotation of motor 308 that is driven by motor drive unit 303 housed in electrical component box 310. Then, the blower motor blows air into heat-exchanger chamber 309 through heat exchanger 307. As electric motor 308, the above electric motor of the first exemplary embodiment, for example, can be used.

The electric device of the present invention has an electric motor, and a case including the electric motor. As the electric motor, the electric device uses the electric motor of the present invention structured as above.

EXAMPLE 4

As an example of an electric device of the present invention, next, the structure of a hot water supplier is detailed, as the fourth exemplary embodiment.

Figure 14:
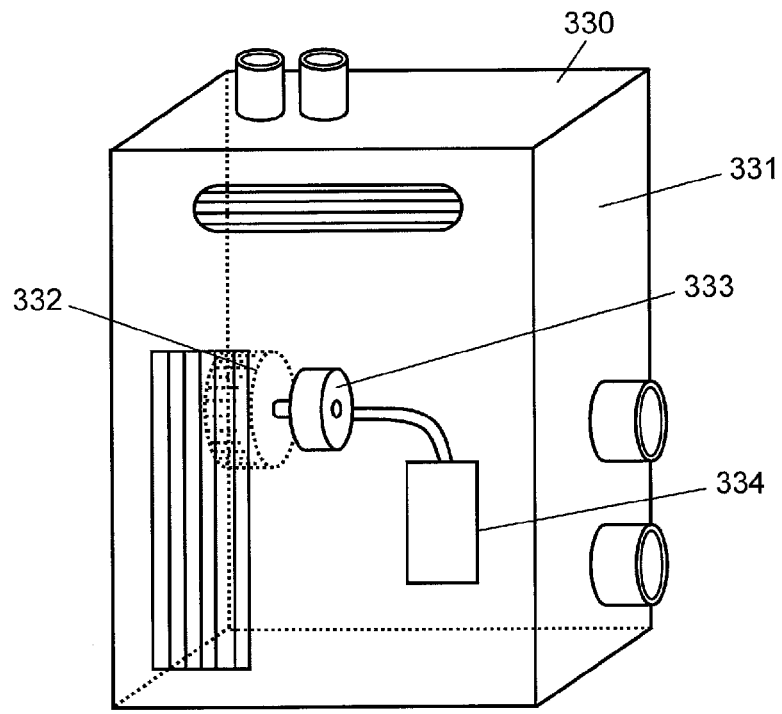
FIG. 14 is a structural diagram of an electric device (hot water supplier) in accordance with a fourth exemplary embodiment of the present invention.

With reference to FIG. 14, electric motor 333 is included in case 331 of hot water supplier 330. Fan 332 is attached to the rotary shaft of electric motor 333. Electric motor 333 is driven by electric motor drive unit 334. By energization of electric motor drive unit 334, electric motor 333 is rotated, and thereby fan 332 is rotated. By the rotation of fan 332, air necessary for combustion is blown to a fuel volatilizing chamber (not shown). As electric motor 333, the above electric motor of the first exemplary embodiment, for example, can be used.

The electric device of the present invention has an electric motor, and a case including the electric motor. As the electric motor, the electric device uses the electric motor of the present invention structured as above.

EXAMPLE 5

As an example of an electric device of the present invention, next, the structure of an air cleaner is detailed, as the fifth exemplary embodiment.

Figure 15:
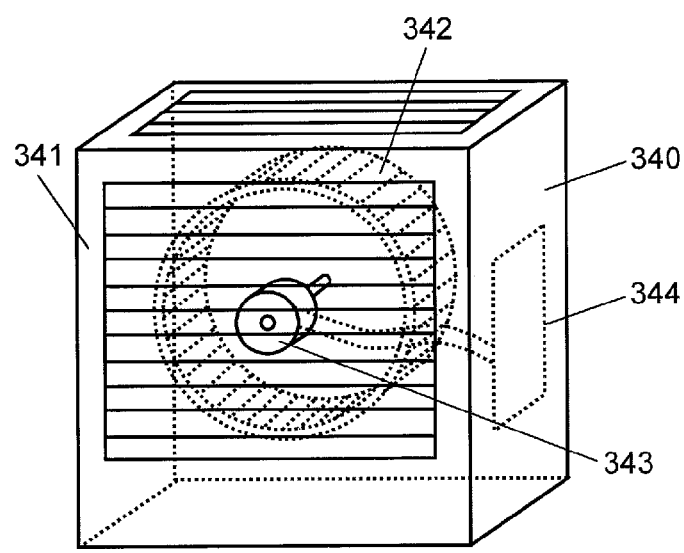
FIG. 15 is a structural diagram of an electric device (air cleaner) in accordance with a fifth exemplary embodiment of the present invention.

With reference to FIG. 15, electric motor 343 is included in case 341 of air cleaner 340. Air circulating fan 342 is attached to the rotary shaft of electric motor 343. Electric motor 343 is driven by electric motor drive unit 344. By energization of electric motor drive unit 344, electric motor 343 is rotated, and thereby fan 342 is rotated. By the rotation of fan 342, air is circulated. As electric motor 343, the above electric motor of the first exemplary embodiment, for example, can be used.

The electric device of the present invention has an electric motor, and a case including the electric motor. As the electric motor, the electric device uses the electric motor of the present invention structured as above.

In the above description, an electric motor included in an air-conditioner indoor unit, air-conditioner outdoor unit, hot water supplier, or air clearer, for example, is used for the exemplary embodiments of the electric devices of the present invention. Needless to say, the present invention can be applied to other electric motors, electric motors included in various information technology devices, and electric motors used in industrial equipment.

In the structure of the exemplary embodiments of the present invention, as described above, the power supply circuit of the driving circuit (including the control circuit) for driving the electric motor, using an inverter of the PWM system, is electrically insulated from the primary circuit of the power supply circuit and the ground earth on the primary circuit side. Even without using a conventional structure where the stator iron core of an electric motor is electrically connected to the ground earth, the advantage of suppressing electrolytic corrosion in the bearing can be obtained.

Industrial Applicability

The electric motor of the present invention is capable of reducing the shaft voltage, and is most suitable for suppressing the occurrence of electrolytic corrosion in the bearing. For this reason, the present invention is effective in electric motors included mainly in electric devices where low cost and long life are requested to the electric motors, e.g. an air-conditioner indoor unit, air-conditioner outdoor unit, hot water supplier, and air clearer.

The invention claimed is:
1. An electric motor comprising:
a stator having a stator iron core and a winding wound thereon molded together by a layer of resin mold;
a printed wiring board with a drive circuit mounted thereon for energizing the windings, no part of the printed wiring board being molded in the resin mold;

a rotor comprising:
  a rotating body holding a permanent magnet in a circumferential direction so that the permanent magnet faces the stator; and
  a shaft having the rotating body fastened thereto so as to penetrate through a center of the rotating body;
a pair of bearings for journaling the shaft;
two conductive brackets for fixing the pair of bearings, respectively;
a conducting member electrically connecting the two brackets to each other, wherein the conducting member runs inside the layer of resin so that the conducting member is electrically insulated from the stator iron core, and no part of the conducting member is in physical contact with the printed wiring board; and
a dielectric layer being formed in the rotating body between the shaft and an outer periphery of the rotating body.

2. The electric motor of claim 1, wherein the two brackets are insulated from the stator iron core.

3. The electric motor of claim 1, wherein at least one of the two brackets is integrally molded in the layer of resin.

4. The electric motor of claim 1, wherein the dielectric layer is an insulator for suppressing electrolytic corrosion.

5. The electric motor of claim 1, wherein the dielectric layer is an insulating resin.

6. The electric motor of claim 1, wherein the dielectric layer is formed between the shaft and the rotating body so as to circle a periphery of the shaft.

7. The electric motor of claim 1, wherein the dielectric layer is formed between an inner peripheral side and an outer peripheral side of the rotating body so as to circle a periphery of the shaft.

8. The electric motor of claim 1, wherein
the rotating body has an outer iron core forming a radially outer part of the rotating body, an inner iron core forming a radially inner part of the rotating body and fastened to the shaft, and the dielectric layer arranged between the outer and inner iron cores, and
the outer iron core and the inner iron core are fixed to each other via the dielectric layer.

9. The electric motor of claim 8, wherein the dielectric layer is shaped to have outer and inner peripheries whose radii change at angular intervals.

10. The electric motor of claim 1, wherein the rotor is disposed rotatably in an inner peripheral side of the stator.

11. The electric motor of claim 1, where the dielectric layer is formed so as to increase an impedance of the rotor.

12. An electric device comprising the electric motor of claim 1.

13. An electric device comprising the electric motor of claim 2.

14. An electric device comprising the electric motor of claim 3.

15. An electric device comprising the electric motor of claim 4.

16. An electric device comprising the electric motor of claim 5.

17. An electric device comprising the electric motor of claim 6.

* * * * *